Inventor
Ralph Miller by Parker & Carter
Attorneys

Jan. 9, 1962     R. MILLER     3,015,934
LOAD ACCELERATOR FOR SUPERCHARGED ENGINE
Filed Nov. 29, 1956     5 Sheets-Sheet 4

Inventor
Ralph Miller by Parker & Carter
Attorneys

Jan. 9, 1962   R. MILLER   3,015,934
LOAD ACCELERATOR FOR SUPERCHARGED ENGINE
Filed Nov. 29, 1956   5 Sheets-Sheet 5

Inventor
Ralph Miller by Parker & Carter
Attorneys

# United States Patent Office 3,015,934
Patented Jan. 9, 1962

3,015,934
LOAD ACCELERATOR FOR SUPERCHARGED ENGINE
Ralph Miller, 1943 N. Summit Ave., Milwaukee 2, Wis.
Filed Nov. 29, 1956, Ser. No. 625,027
22 Claims. (Cl. 60—13)

This invention is in the field of internal combustion engines and is in the nature of a method of operation and also an internal combustion engine apparatus constructed to operate to overcome supercharger lag with rapid load changes.

A primary object of my invention is a method of operating a gas fueled, spark fired, internal combustion engine having an exhaust driven supercharger, so that the engine will not stop or die when load is rapidly applied.

Another object is a method of operating the above type of engine in which the lag of the supercharger, when a heavy load is applied, is compensated.

Another object is an internal combustion engine having an exhaust driven supercharger and supplied with gas fuel with means for maintaining an approximately constant air-fuel ratio mixture in the cylinder when heavy load change, either an increase or decrease, is rapidly applied to the engine.

Another object is a method of operating a turbo charged engine of the gas fueled, spark fired type to prevent the engine from quitting under extreme load changes.

Other objects will appear from time to time in the ensuing specification and drawings in which.

Figure 13:
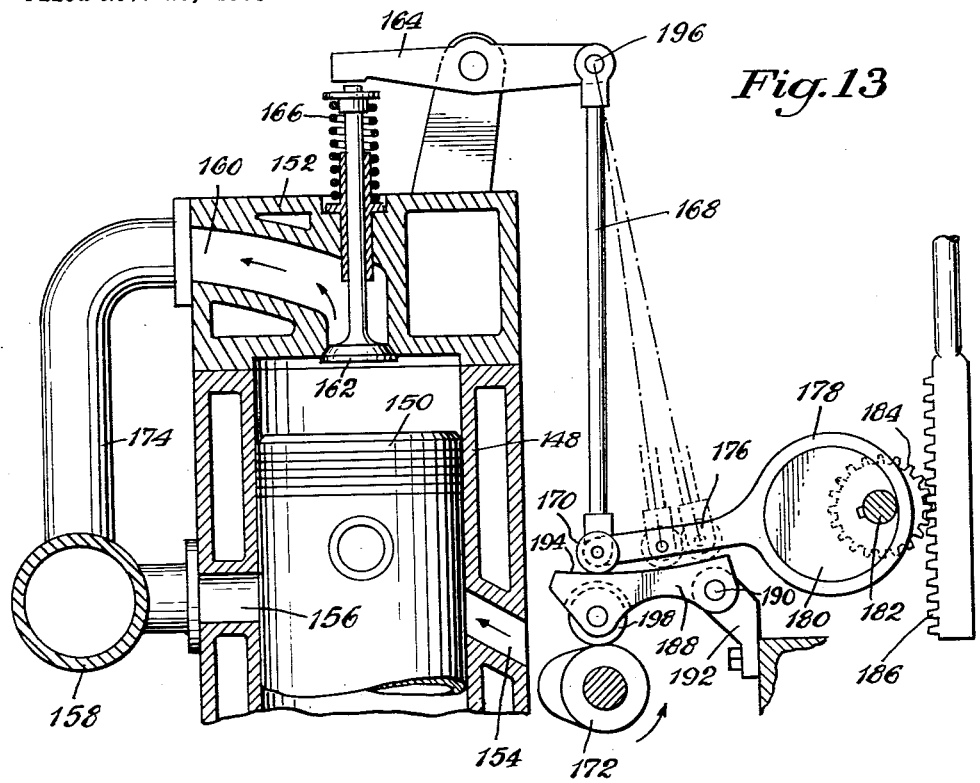

FIGURES 4 to 12, inclusive, are valve timing diagrams for different methods of operation;

FIGURE 13 is a vertical section of a further variant form, and

Figure 14:
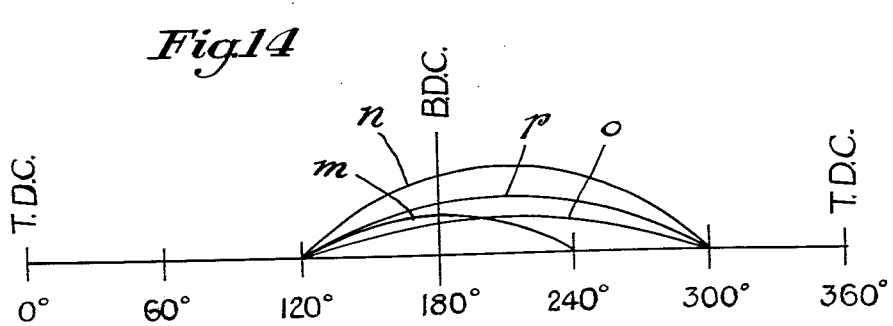

FIGURE 14 is a valve lift diagram.

Figure 1:
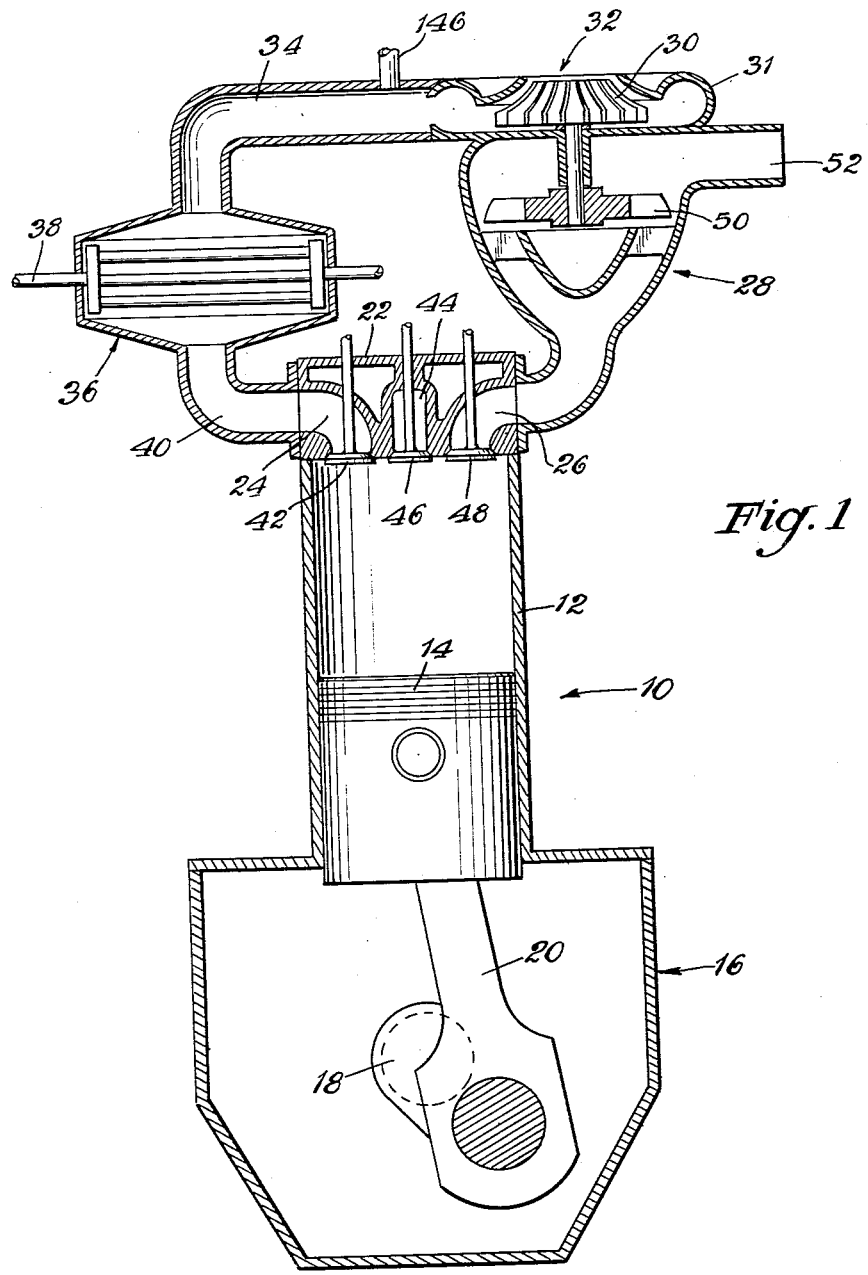
FIGURE 1 is a vertical section of a diagrammatic four cycle engine.

In FIGURE 1, I have diagrammatically shown an internal combustion engine 10. The engine may include a cylinder 12 and piston 14 and a conventional crank case 16 housing a crankshaft 18, connected by one or more throws to a conventional connecting rod 20. The cylinder may have the usual cylinder head at 22 with one or more inlet ports 24 and one or more exhaust ports 26.

A supercharger, indicated generally at 28, is the exhaust driven type. It may include a compressor 30 in any type of suitable housing 31 constructed to draw in inlet air through a suitable inlet 32, possibly through a filter, to raise its pressure and temperature. From the compressor, the air may be supplied by a suitable duct 34 to an intercooler 36 having suitable connections 38 for a cooling fluid, such as water, to withdraw the heat of compression from the air. After the intercooler, the compressed cooled air is supplied through a duct 40 to the inlet port 24. The inlet port is controlled by a valve 42 which may be actuated in a manner to be set forth hereinafter.

Fuel is supplied to the engine in the form of gas through a suitable passage 44, in FIGURE 1, which enters the cylinder head generally at right angles to the other passages, although it should be understood that the gas passage may be in any direction. In any event, the gas is controlled by a suitable gas valve 46 so that at appropriate times gas is admitted to the cylinder to mix with the air supplied through the inlet port 24 to form a combustible mixture. The mixture is ignited by a suitable ignition device such as a spark plug or the like, although I have not shown one. An exhaust valve 48 controls the exhaust port 26 and at a suitable time this valve is opened to allow the hot products of combustion to escape through the exhaust passage 26 to a turbine 50 that is coupled in a suitable manner to the compressor. Thus, the energy in the exhaust gas drives the turbine which compresses the air in the compressor. After the products of combustion pass through the turbine, they may be exhausted through a suitable outlet 52.

The showing in FIGURE 1 will be recognized as a conventional turbocharged, intercooled four cycle engine supplied with gas through a suitable gas valve and having a spark plug. The supercharger may be of any conventional type as long as it is driven by the exhaust products and I shall hereinafter refer to it as an exhaust driven supercharger or a turbocharger. Additionally, the intercooler may be of any conventional type and the one shown is only diagrammatic without details.

The engine operates generally in accordance with the disclosure of my copending application Serial No. 311,032, filed September 23, 1952, now Patent No. 2,773,490. Air is first compressed in the supercharger and may be delivered to an intercooler where at least a part of the heat of compression is removed. Thereafter, the compressed, cooled air is supplied to the cylinder through the inlet valve. At full load, the inlet valve is timed or actuated so that it closes either early or late, to provide a reduced effective compression ratio. In short, substantially less air than the full volumetric capacity of the cylinder is entrapped. For example, at full load the inlet valve might be closed 70 or 80 degrees before bottom dead center so that the effective compression ratio is on the order of 6 to 1. Or, the time of closing might be delayed passed bottom dead center with closing occurring 60 or 70 degrees before top dead center in which case the effective compression ratio would be reduced, say, for example, 6 to 1. In either case, the compression ratio could be the same and the expansion ratio could be normal, for example, 12 to 1, and the exhaust valve would be opened when the piston was at or near bottom dead center to provide a full power stroke.

The compression ratio is independent of the expansion ratio and each is selected for different considerations. A compression ratio may be selected for the particular fuel being used so that the volume of air entrapped or retained, in relation to the combustion chamber volume, is below the net compression ratio that will cause detonation, due to an excessive final compression of the air into the combustion chamber. On the other hand, the expansion ratio is selected for the maximum thermal efficiency. The net compression ratio depends a great deal upon the octane rating of the particular fluid used.

The temperature rise due alone to compression in the cylinder is a function of the compression volume ratio and manifold temperatures only, and is independent of the pressures. For best performance and efficiency, a gas engine must operate with substantially constant air-fuel ratios at all loads. Therefore, at full load the compression volume ratio is selected in accordance with the particular fuel used to produce a final compression temperature that will not cause detonation. For example, with natural gas the compression ratio might be 8 to 1. The expansion ratio, chosen for thermal efficiency, for example, might be 12 to 1. At the intermediate loads, the volume entrapped is either varied or held constant in accordance with the characteristics of the air supplying device, i. e., the exhaust driven supercharger.

Exhaust driven superchargers generally fall into one of three categories, first those in which the absolute pressure of the compressor outlet air in the inlet manifold of the engine falls at a slower rate than the load, second the absolute pressure in the inlet manifold falls at approximately the same rate as the load, and third the absolute pressure falls at a faster rate than the load.

In the first case, where the manifold pressure falls at a slower rate than the load, the valve timing or actuation is such that the volume of air entrapped, as the load falls, is decreased to maintain an approximately constant air-fuel ratio mixture in the cylinder.

As the load is varied, the actuation or time of closing of, say, the inlet valve is varied in relation to the load. This means that as the load falls, I advance the time of closing of the inlet valve, for example, when the valve is being closed early during the suction stroke ahead of bottom dead center. Or, if the valve is being closed late after bottom dead center during the compression stroke to provide the effective reduced compression ratio, as the load falls I would retard or delay the time of closing. In either case the important point is that the volume of air entrapped by the closing of the inlet valve is reduced as the load falls so that the total amount of air entrapped at any particular load is such, in relation to the pressure of the air being supplied by the supercharger and the quantity of fuel being admitted by the fuel valve, that the resulting mixture in the cylinder has an approximately constant air-fuel ratio for all loads without throttling the inlet air.

Instead of actuating the inlet valve to provide the effective reduced compression ratio at full load and variations thereof at the lesser loads, I might open and close the exhaust valve during the compression stroke so that some of the air in the cylinders that would normally be entrapped is rejected through the exhaust valve during the compression stroke. In either case, whether I actuate the inlet valve or the exhaust valve, or a special valve for that matter, I reduce the total volume of air entrapped so that at all loads the resulting mixture in the cylinder has an approximately constant air-fuel ratio and at full load the quantity entrapped is substantially less than the full volumetric capacity of the cylinders.

The showing in FIGURE 1 and the other figures is only diagrammatic and it will be obvious that the invention can be applied to a multi-cylinder engine.

When the engine is operating at light loads or at no load after starting, the compression ratio, caused by the actuation of the valves, may be quite low. For example, it could be 4 to 1. The gas valve is normally controlled by the governor and as soon as a heavy load is thrown on, the gas valve will be actuated to admit the full load quantity of fuel. Assume for the moment that the inlet valve is being variably timed in response to a load factor to provide the variable compression ratio. As soon as full load is thrown on the engine, the timing of the valves will be changed so that the compression ratio becomes 6 to 1. But the exhaust driven supercharger lags due to its flywheel effect or inertia and insufficient air will be supplied to the cylinders to maintain the approximately constant air-fuel ratio mixture. Since the gas valve will be supplying the full load quantity of gas, the cylinders will, in effect, be flooded. The mixture will be too rich to ignite and the engine will die and stop.

I provide a method of operation and structure whereby a full quantity of air may be entrapped in the cylinders corresponding to the full load quantity of fuel so that the approximately constant air-fuel ratio mixture will be entrapped in the cylinder at all loads and even during rapid load change so that the engine will not be flooded.

To accomplish this, it should be borne in mind that during steady state running at full load I do not entrap the full cylinder volume. I may be entrapping approximately half. Therefore, when a heavy load is rapidly applied, I vary the timing of the controlling valve, either the inlet or the exhaust, so that a substantially greater cylinder volume than the normal full load amount is entrapped. For example, it might be the full cylinder capacity. The inlet valve might be timed to close when the piston is at bottom dead center or at the point of maximum filling, depending upon the engine's speed. Therefore, even though the pressure of the air being supplied is below that normally associated with full load, the volume is materially increased so that the weight of air will correspond approximately to the full load requirements. This weight of air when mixed with the fuel supplied will give a mixture having the approximately constant air-fuel ratio and the mixture will ignite. Thereafter, as the supercharger comes up in speed, thereby increasing the pressure and specific weight of the air being supplied, I may vary the valve operation so that the volume entrapped is reduced. This can be done by either retarding or advancing the inlet valve, or the exhaust valve. In either case, the timing or actuation is changed such that the entrapped volume is reduced but the total weight of air remains approximately constant. Even though the volume is reduced, the pressure is increased and one compensates for the other. In effect, the valve timing or actuation slides back as the supercharger pressure increases until the supercharger is at the full load speed where the valve actuation is such that the full load entrapped volume is reached.

Figure 2:
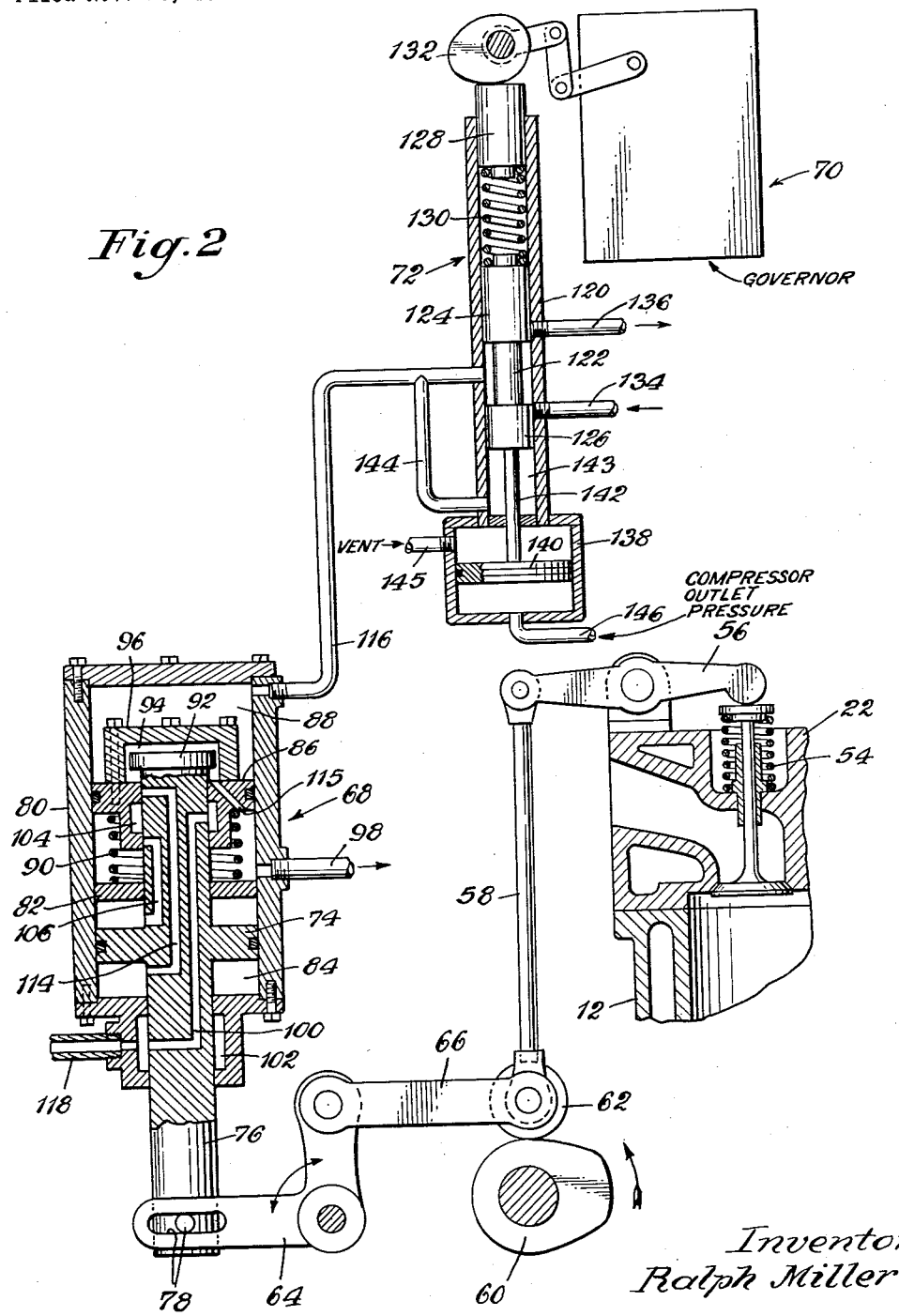
FIGURE 2 is a vertical section of a diagrammatic control system for the engine of FIGURE 1.

In FIGURE 2, I illustrate a mechanism for operating the engine in this manner and it should be understood that this is only one example and various other mechanisms may be used to carry out the invention. In other words, the details of the mechanism in FIGURE 2 are unimportant. The valve shown could be either the inlet or exhaust valve and I shall refer to it merely as the controlling valve. The valve may have the usual spring 54 and rocker arm 56 actuated by a push rod 58 which rides on the usual camshaft 60. A roller follower 62 at the end of the push rod is moved back and forth by a crank arm 64 through a link 66 to either advance or retard the time of closing of the valve. A control mechanism 68 operates the crank arm in response to the governor position, the governor being indicated at 70, through an accelerator device indicated generally at 72.

The control mechanism 68 includes a piston 74 with a stem or piston rod 76 connected to the bell crank 64 by a pin and slot connection 78. The cylinder housing 80 has a chamber which is divided into an upper and lower chamber by a wall 82, the piston 74 being in the lower chamber 84. An air piston 86 is positioned in the upper chamber 88 and straddles a plurality of openings for a group of central passages in the piston stem 76. A spring 90 bears against the wall 82 in the housing and biases the air piston toward the top of the housing. A collar or enlargement 92 is shown at the upper end of the stem to limit the travel of the air piston 86 and is positioned in a chamber 94 defined by a housing 96 on the air piston.

The stem 76 has a plurality of longitudinal fluid passages with ports on its surface. Fluid is discharged to a sump through an appropriate connection 98 in the upper compartment or chamber. One of the control passages 100 in the piston stem conducts fluid from an outside chamber 102 to a chamber 104 in the air piston. Another central passage 106 leads from the upper side of the piston 74, and a third central passage 114 leads from the lower side of the piston, and their other ends are controlled by the air piston 86. Passages 115 in the air piston communicate the chamber 94 with the lower side of the air piston.

Hydraulic fluid from the accelerator mechanism 72 is conveyed through an appropriate pipe 116 to the upper compartment 88 above the air piston. As this pressure varies, it tends to move the air piston. As the pressure increases, the air piston moves down compressing the spring 90, and as the pressure decreases, the spring moves the air piston up. Movement of the air piston controls the communication that is established between the various chambers through the central passages 100, 106, and 114, as explained hereinbelow. A source of high pressure fluid 118 communicates with the chamber 102 and the passage 100. This source of fluid could be the engine's lubricating system.

The mechanism 72 includes a housing or chamber 120 with the dumbbell valve 122 generally in the center having upper and lower lobes, 124 and 126, respectively. A piston or plunger 128 is mounted in the upper part of the chamber and a spring 130 is interposed between the top of the valve and the plunger. A cam 132 controlled by the governor 70 bears against the plunger or piston 128, it being understood that as load increases the cam depresses the plunger 128 and as load decreases it allows the plunger 128 to be raised by the spring. The limits of movement of the cam 132 are not indicated, however, it should be understood that they are conventional, the details of the governor are unimportant, and its exact manner of operation is not pertinent to this invention.

A source of high pressure fluid is connected to the chamber by a suitable pipe 134 and a spill 136 is also connected to the chamber and may return to a suitable sump or source of supply. The upper lobe 124 on the dumbbell valve controls the spill while the lower lobe 126 controls the inlet from the high pressure source. The pipe 118 on the mechanism 68 may be connected to the same source as the pipe 134. In any event, the important point is that high pressure fluid is applied at these two points. A chamber 138 at the bottom of the cylinder carries a piston 140 which is connected to the dumbbell valve by a suitable stem or the like 142. The space or chamber 143 above the piston and below the valve is communicated to the pressure line 116 by a bypass 144 and a vent 145 is provided so that a vacuum or pressure will not be formed above the piston 140. The cylinder below the piston 140 is connected by a suitable lead 146 to the conduit 34 in FIGURE 1 between the compressor of the supercharger and the intercooler so that the pressure of the air from the supercharger will be communicated to the piston. It should be remembered that the outlet pressure from the supercharger will vary in direct relation to the speed of the supercharger.

Figure 4:
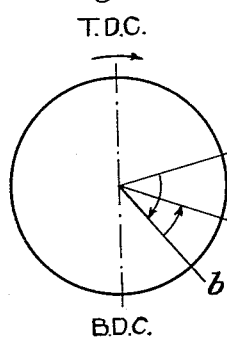

The operation of the structure in FIGURE 2 is as follows:

Assume that the inlet valve is being variably timed and closed ahead of bottom dead center, instead of after bottom dead center. In FIGURE 4, for example, the closing time of the inlet valve during the suction stroke of the piston for no load is indicated at a, with the full load closing position being indicated at c. As soon as a heavy load is applied, for example, full load, and the engine is accelerating, the timing is delayed or retarded so that the inlet valve closes at position b, and the volume entrapped is substantially increased. At the same time, the governor will actuate the gas valve 46 in FIGURE 1 so that the full load quantity of gas will be supplied. Due to the retarded timing of the inlet valve, the volume of air entrapped will correspond to the gas supplied so that the air-fuel ratio of the mixture will remain constant. Thereafter, as the supercharger picks up speed and overcomes its inertia or flywheel effect, the time of closing should be advanced somewhat uniformly from the position b to the position c in FIGURE 4 so that as the pressure of the air from the supercharger increases, the volume entrapped is reduced and the result is a constant weight of air matching the quantity of fuel.

In FIGURE 2, as soon as load is applied and the engine starts accelerating, the cam 132 moves from its no load to its full load position. The plunger 128, spring 130 and valve 132 are all depressed with the spring being compressed somewhat but being sufficiently stiff to maintain a relative spacing between the plunger and valve. The lobe 126 of the valve uncovers the high pressure connection 134 so that high pressure fluid flows through the valve and pipe 116 to the chamber 88. The air piston 86 will be depressed, compressing the spring 90, and placing the source of fluid 118 in communication with the passage 106 in the top of the fluid piston 74 through the chamber 102, passage 100, chamber 104, and passage 106. This causes the stem 76 of the piston to move down, and the crank 64 will be rotated counterclockwise moving the follower roller 62 to the left, thereby delaying or retarding the time of closing of the valve, the camshaft rotating counterclockwise as indicated. As pressure increases in pipe 116, it is communicated to the chamber 143 under the dumb bell valve by the bypass 144. The pressure on both sides of the lobe 126 will be the same, but the force on the lower surface will be greater due to the greater area. The result is that after a short period of time, the resultant upward force will overcome spring 130 and compress it somewhat further and will move the dumb bell valve back to its neutral position.

This operation of the mechanism delays the time of closing quickly to the point b in FIGURE 4. The supercharger is still at a speed corresponding approximately to no load or light load, and the pressure of the air being supplied is relatively light. Nevertheless, a substantially larger volume of air is being entrapped and the air-fuel ratio of the mixture in the cylinder remains approximately constant. The temperature of the exhaust gas from the cylinder will increase and accordingly the supercharger will pick up speed. As it does, the pressure of the inlet air from the supercharger increases, which is communicated by the pipe 146 to the lower side of the piston 140. The increasing air pressure raises the piston 140 and the valve 122 but the plunger 128 and cam 132 remain in the same position because the spring 130 is further compressed.

As the valve 122 rises the lobe 124 uncovers the spill passage 136. Fluid in the line 116 and in the chamber 88 will be vented and returned to the sump. The spring 90 will force the air piston 86 to rise, placing the source of fluid 118 in communication with the lower side of the fluid piston 74 through the chamber 102, line 100, chamber 104 and line 114. The high pressure fluid from the line 118 will cause the piston to rise, rotating the crank 64 clockwise, moving the follower roller 62 toward the right and, therefore, advancing the time of closing of the inlet valve. At the same time the pressure in line 116, pipe 144, and chamber 143 under the dumb bell valve will drop since the spill passage 136 is open. The resultant force upward on the dumb bell valve will decrease and after a short period of time, the compressed spring 130 will have a force that is greater than the decreasing upward fluid thrust. At this point, the spring will push the dumb bell valve back to its neutral position.

In summary, as soon as the load is applied, the high pressure source of fluid causes the follower roller 62 to move to the left, delaying the time of closing to position b and thereafter as the supercharger picks up speed, the increasing air pressure on the piston 140 causes the actuating mechanism to move the follower 62 back to the right advancing the time of closing of the valve and thereby reducing the volume entrapped. In short, the amount of advancement of the closing time is directly tied to the supercharger pressure. The higher pressure inlet air will be more dense and accordingly even though the entrapped volume is reduced, the total weight entrapped will be approximately constant.

Figure 5:
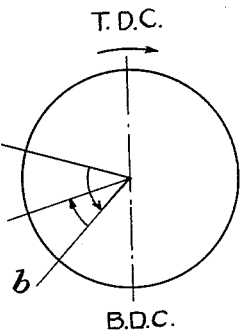

In FIGURE 4, I have described the operation of the mechanism in FIGURE 2 with the inlet valve being closed early and varied during the suction stroke of the piston. But it should be understood that the valve may be held open and closed late during the compression stroke. This is illustrated in FIGURE 5. At no load the time of closing of the valve during the compression stroke is indicated at a. Therefore, the volume entrapped is quite small. In response to the rapidly applied load, the time of closing is quickly advanced to the point b so that the volume is materially increased. Thereafter, as the supercharger comes up in speed and a greater weight of air is supplied, the time of closing of the valve is delayed to the point c.

The important point is, in both FIGURES 4 and 5, regardless of on which side of bottom dead center the inlet valve is closed, regardless of how the valve is actuated, be it the inlet or the exhaust valve, the entrapped volume of air is directly related to the load on the engine and the pressure of the inlet air from the turbocharger so that the weight of air entrapped is directly related to the load to maintain an approximately constant air-fuel ratio in the cylinder.

Figure 6:
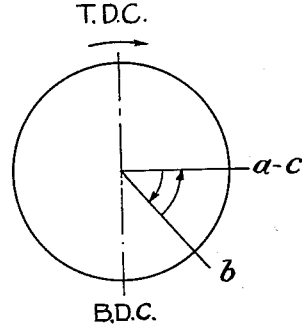

FIGURES 4 and 5 are examples of the valve actuation of an engine where the turbocharger has the characteristic of supplying air at an absolute pressure in the manifold that falls at a slower rate than the load as load decreases, but there are two other possibilities, as mentioned previously. For example, I may choose to use an exhaust driven supercharger that has the characteristic of the absolute pressure in the manifold falling at approximately the same rate as the load when load is decreased. The valve timing for such an engine is shown in FIGURE 6 where the closing times represent those of the inlet valve being closed variably during the suction stroke of the engine. At no load the valve closes at point a entrapping approximately half of the cylinder capacity. As soon as a heavy load is rapidly applied and the engine is accelerating, the closing time is retarded to b where a substantially larger volume of air is entrapped. Thereafter, as the supercharger comes up in speed and the pressure of the air in the inlet manifold increases, the mechanism uniformly advances the closing time until at full load at point c it may coincide approximately with point a. In effect, the supercharger is matched to the engine so at any load during steady running the closing time will be at the same point. In FIGURE 6, I have shown the inlet valve closed during the suction stroke before bottom dead center which could be closed during the compression stroke after bottom dead center, similar to FIGURE 5.

Figure 7:
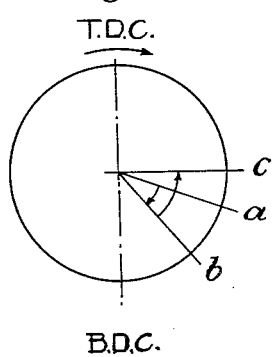

For the third case, the exhaust driven supercharger has the characteristic of supplying air at an absolute pressure in the inlet manifold at a rate that falls at a faster rate than the load as load is decreased, therefore, the volume of air entrapped in the cylinder for compression is increased as load decreases. FIGURE 7 is the example of this timing, and again I have shown the inlet valve closed during the suction stroke ahead of bottom dead center, but it could be closed during the compression stroke after bottom dead center, similar to FIGURE 5. At no load the inlet valve closes at point a. When a heavy load is quickly applied and the engine is accelerating, the valve control mechanism delays the time of closing to point b so that a substantially larger volume of air is entrapped. Thereafter, as the supercharger comes up to speed and the manifold pressure increases, the mechanism will advance the time of closing to point c. It should be noticed that at point c, which is the full load closing time, the entrapped volume is actually smaller than the no load entrapped volume at point a. But the total weight of air in the cylinder at point c is greater than at point a, because the pressure of the air being supplied is so much greater at full load than at no load.

In all three cases with all three types of superchargers, the control mechanism may be the same as shown in FIGURE 2 or similar. Whether the supercharger supplies air at a rate that falls slower, approximately the same, or faster than the load as load decreases, the valve actuation is such that initially, as soon as load is applied and the engine is accelerated, the volume entrapped is substantially increased, possibly to the full cylinder capacity, but thereafter as the supercharger increases in speed and the pressure and density of the air being supplied to the engine increases, the volume entrapped is reduced as shown in FIGURES 4, 6 and 7, for each of the three examples. For all three, a control mechanism such as in FIGURE 2 could be used and merely changing the cam 132 or the spring 130 would change the operation to conform to the turbocharger of FIGURE 4, 6 or 7, as desired. Additionally, the FIGURE 2 mechanism is shown as closing the inlet valve during the suction stroke in accordance with FIGURES 4, 6 and 7, whereas FIGURE 5 shows the closing time delayed past bottom dead center to the compression stroke. But if the camshaft 60 is imagined as rotating clockwise in FIGURE 2, instead of counterclockwise as shown, the mechanism would operate in accordance with FIGURE 5.

Figure 8:
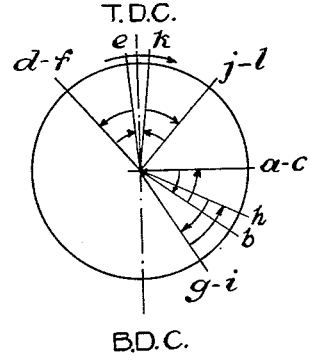
Figure 9:
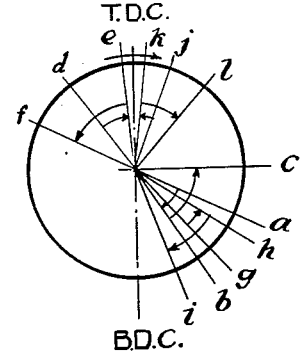

In the case of a four cycle engine having both an inlet and an exhaust valve, I find it desirable on occasion to variably time or control both of them and FIGURES 8 and 9 are examples of this.

Considering FIGURE 8 first, the exhaust driven supercharger has the characteristics of supplying air at an absolute pressure in the inlet manifold that falls at a rate approximately the same as the load as load decreases, such as FIGURE 6. Letters a, b, c indicate the closing time of the inlet valve while letters d, e, f indicate its opening time. Letters g, h and i indicate the opening times of the exhaust valve, while letters j, k and l indicate its closing time. At no load, the inlet valve closes at point a and opens at point d with the exhaust valve closing at j and opening at g. Thus, a substantial overlap is provided for scavenging between points d and j; a long expansion stroke is provided from top dead center to point g; and a relatively small volume of air is entrapped at point a. As soon as a heavy load is rapidly applied, the time of closing of the inlet valve is retarded from a to b, increasing the entrapped air volume. This retards the opening time from the point d to e, reducing the overlap. At the same time, the exhaust valve opening is advanced from g to h providing a shorter expansion stroke and allowing the high temperature products of combustion to escape from the cylinder to the turbocharger thereby supplying additional energy to the turbine to bring it up to speed more rapidly. Since the time of opening of the exhaust valve is advanced, the closing time will also be advanced from j to k. Note that the overlap is substantially reduced and almost eliminated between points e and k, a few degrees. Thereafter, as the supercharger comes up in speed and the pressure of the air being supplied to the cylinder is increased, the inlet valve's closing time will be advanced from b to c which may coincide with a and the opening time will be advanced from e to f which may coincide with d, thereby opening up or increasing the valve overlap. At the same time, the opening time of the exhaust valve may be retarded from h to i which may correspond to point g and the closing time may also be retarded from k to l thereby additionally opening up the valve overlap. It will, therefore, be seen that at no load a relatively small volume will be entrapped. As soon as a heavy load is applied, the valve overlap is virtually eliminated, reducing scavenging and preventing the backflow of gases to the inlet side. At the same time the exhaust valve is opened much earlier providing additional energy to help the supercharger come up in speed. As its speed increases, the valve overlap is increased both by retarding the exhaust closing and advancing the inlet opening and at the same time the exhaust opening is retarded thereby increasing the effective expansion stroke and applying more power to the drive shaft. For the FIGURE 8 operation, a mechanism such as in FIGURE 2 could be applied to both the inlet and exhaust valves and for that matter the valve shown in FIGURE 2 may be considered either the inlet or the exhaust. In addition, one such control could be used for both the inlet and exhaust with the roller followers for the inlet and exhaust valves 180 degrees out of phase so that in response to the same movement of the piston rod 76, one would be advanced and the other retarded, and vice versa.

In FIG. 9, I have given an example of the engine operation where the supercharger has the characteristic of its absolute inlet pressure falling at a faster rate than the load, so that the volume of air entrapped must be increased as the load decreases, corresponding somewhat to FIGURE 7. At no load or light loads, the inlet valve is closed at $a$ and opened at $d$. When a heavy load is rapidly applied and the engine is accelerating, the time of closing of the inlet valve is retarded to position $b$ entrapping a larger volume of air while the time of opening is retarded to $e$ reducing the valve overlap. Thereafter, as the supercharger comes up in speed, the time of closing will be advanced to point $c$, while the opening will be advanced to $f$, thereby increasing the overlap. Correspondingly, the exhaust valve, at no load, will be opened at the point $g$ and closed at the point $j$ providing very little overlap. As soon as load is applied and the engine is accelerating, the opening time will be advanced to $h$ decreasing the effective expansion stroke and tapping more energy from the cylinder for the supercharger. At the same time, the valve overlap will be reduced because the closing time of the exhaust valve is advanced to $k$. As the supercharger comes up in speed, the closing time of the exhaust valve will be retarded to the point $l$ while the opening time will be retarded to the point $i$. This arrangement has the distinct advantage that as soon as the load is applied, the overlap is reduced to practically nothing preventing reverse scavenging. Thereafter, as the supercharger comes up in speed, the overlap is increased uniformly so that at full load, full scavenging is acquired. At the same time, as soon as load is applied, additional energy is supplied to help the supercharger catch up.

In both FIGURES 8 and 9, it should be understood that at no load and light loads, the exhaust pressure has a tendency in four cycle engines to be higher than the inlet manifold pressure which will cause reverse scavenging and, therefore, very little, if any, overlap is desirable. But at the higher loads, and particularly full load, the manifold pressure will be substantially higher than the exhaust pressure and a large overlap to provide scavenging and cooling of the cylinder and piston is desirable. As in FIGURE 8, the FIGURE 9 variation could be acquired by having two such control mechanisms as in FIGURE 2 for both the exhaust and inlet valves, or one could be suitably arranged with the follower rollers 180 degrees out of phase in their operation.

Figure 3:
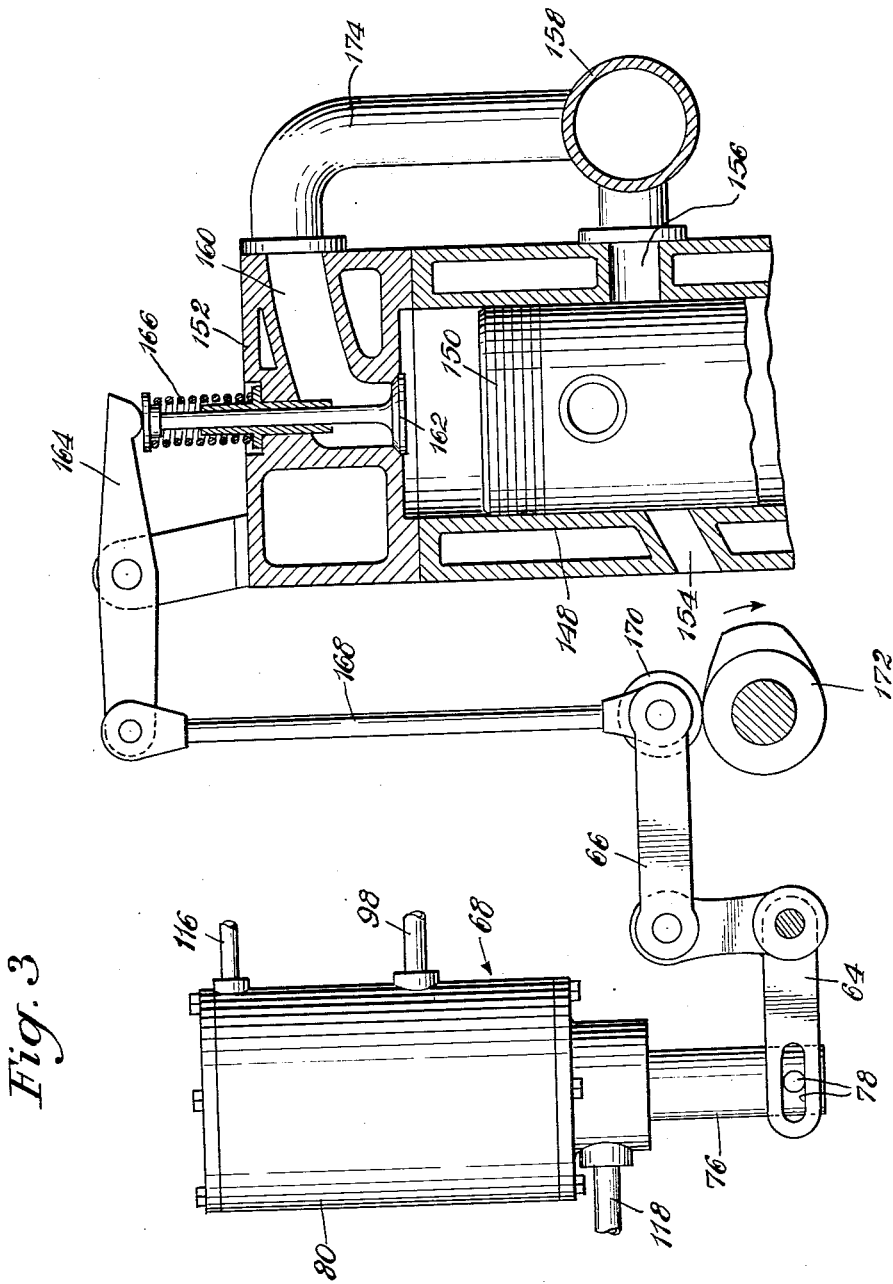
FIGURE 3 is a vertical section of a variant form.

Up to this point, the invention has been illustrated in connection with a four cycle engine. FIGURE 3 shows a port scavenged two cycle engine in which a conventional cylinder 148 has a piston 150 and a cylinder head 152. Suitable inlet ports 154 and exhaust ports 156 are disposed around the waist of the cylinder with the inlet ports being supplied by high pressure cooled air from an exhaust driven supercharger and intercooler to the inlet manifold, not shown. The exhaust products may go to an exhaust manifold 158 which supplies them to the turbine of the supercharger to drive the compressor.

It will be understood that the FIGURE 3 form may have an exhaust driven supercharger and intercooler as in the FIGURE 1 form but I have not shown them for clarity.

The cylinder head has an auxiliary exhaust passage 160 and a compression control or exhaust valve 162 actuated by a rocker arm 164 with a conventional return spring 166. The rocker arm is connected to a push rod 168 which carries a roller 170 opposite a camshaft 172. The exhaust passage 160 may be communicated to the exhaust manifold 158 by a suitable connection 174.

The control in FIGURE 3 for the valve 162 may be the same as in FIGURE 2. It will be understood that the mechanism may include a governor, an accelerator device 72 and a control mechanism 68 to variably position the follower roller 170 on the camshaft. In fact, the valve in FIGURE 2 may be considered the exhaust valve 162 of FIGURE 3. The time of closing of the valve 162 during the piston's compression stroke will determine the effective compression in the cylinder and the amount of air entrapped.

Figure 10:
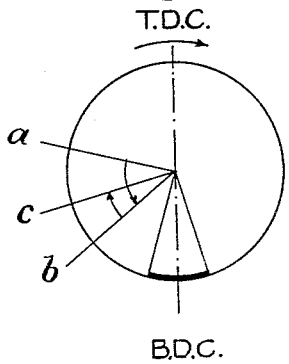

In FIGURE 10 I have shown a valve timing diagram for the FIGURE 3 form. The piston covers the exhaust ports 156 during its compression stroke and uncovers them during its expansion or power stroke. At no load the compression control valve 162 is timed to close late at the point $a$ so that the quantity of air entrapped is quite small. A gas valve or any other suitable gas supplying mechanism, not shown, may supply gas to the cylinder and the resulting mixture is ignited by a spark plug.

When a heavy load is rapidly applied to the engine, an actuating mechanism, such as the one shown in FIGURE 2, advances the time of closing of the compression control valve to the point $b$, for example, so that the volume of air entrapped and, therefore, the total weight of the air is materially increased. As the supercharger begins to come up to speed, the time of closing of the valve is delayed back to the point $c$ which is the full load position. It can be seen that the point of closing at $c$ entraps a substantially larger volume of air than at the position $a$, but not as large as at the position $b$. In any event, as the time of closing moves from $b$ to $c$, the pressure is increasing and the total weight of the air entrapped will remain approximately constant, which when mixed with the fuel supplied, provides an approximately constant air-fuel ratio mixture in the cylinder.

In FIGURE 3, I have shown my invention applied to a port scavenged engine with a compression control valve in the cylinder head. It should be understood, however, that the invention may be applied equally well to uniflow two cycle or opposed piston engines.

Figure 11:
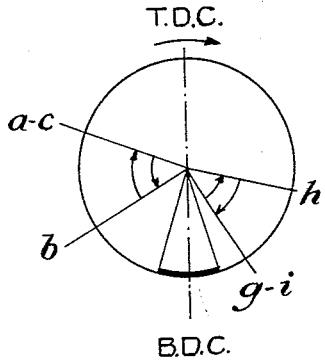
Figure 12:
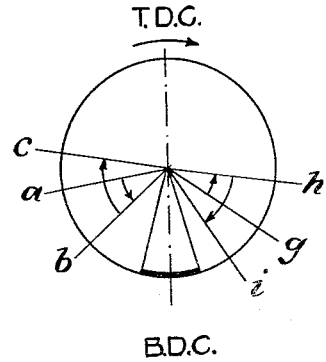

In a two cycle engine such as in FIGURE 3, for example, when the closing time is varied during the compression stroke, the opening time of the valve will also be varied during the expansion stroke, and FIGURES 11 and 12 represent examples thereof. In FIGURE 11, I may, for example, use a turbocharger which has the characteristic of its absolute inlet pressure in the manifold falling at approximately the same rate as the load so that the volume entrapped in the cylinder will be approximately constant at all loads. At no load, the valve closes at $a$ during the compression stroke providing a short compression stroke, a short compression ratio and a small entrapped volume of air. At the same time, the valve opens at $g$ just ahead of the piston uncovering the exhaust ports 156 to provide a short blowdown. As soon as load is applied and the engine is accelerating, the time of closing of the valve is advanced to point $b$ and the time of opening to the point $h$. This has the double advantage that a substantially larger volume of air is entrapped to match the larger quantity of gas being supplied and also the valve opens earlier so that the energy in the cylinder is tapped to the supercharger to help it come up to speed more rapidly. As the supercharger gains in speed and the pressure in the manifold increases, the time of closing will be retarded from $b$ to $c$ and the time of opening will also be retarded from $h$ to $i$. Therefore, the compression stroke will be reduced and the expansion stroke increased so that at full load the effective compression and expansion strokes may be back to approximately the values they were at no load. It should be noted that the FIGURE 3 camshaft should be rotated in the opposite direction from the FIGURE 2 camshaft to get this result.

In FIGURE 12 I have given an example where the exhaust driven supercharger has the characteristic of supplying inlet air at a pressure that falls at a faster rate than the load so that the volume of air entrapped must be increased as load decreases. At no load, the valve 162 for the engine in FIGURE 3 closes at the point a and opens at the point g. As soon as load is applied and the engine is accelerating, the time of closing is advanced to the point b and the time of opening to the point h. Therefore, the volume entrapped is increased and the energy in the cylinder is tapped for the supercharger. As the supercharger comes up in speed, the pressure increases and the volume is reduced until at full load the valve may close at c by retarding the time of closing and the opening time may be retarded to the point i, providing a full expansion stroke with short blowdown before the exhaust ports are uncovered by the piston.

Both FIGURES 11 and 12 have the advantage that as soon as load is applied and the engine is accelerating, the energy in the cylinder is tapped to help the supercharger. But as the supercharger comes up in speed, the expansion stroke is increased in effective length until at full load the full expansion stroke is acquired with only a short blowdown.

In addition, the invention may be applied to engines where the valve, such as valve 162 in FIGURE 3, is constantly timed but provided with different amounts of lift and is closed during the compression stroke of the piston so that variable quantities of air will be rejected from the cylinder leaving variable quantities entrapped. The lift of the valve is varied so that the valve has a throttling effect. A mechanism for carrying this out is shown in my copending application Serial No. 581,713, filed April 30, 1956, now Patent No. 2,817,322.

In FIGURE 13 I have shown such a mechanism and the engine illustrated is similar to the two cycle loop scavenged engine in FIGURE 3. For purposes of clarity, the reference numerals are the same except where differences occur, and the engine is symmetrically reversed. The push rod 168 has a follower roller 170 at its lower end which is also connected to an arm 176 having a strap 178 surrounding an eccentric 180 mounted on a shaft 182 which also carries a pinion 184 in mesh with a rack 186. The rack may be formed, for example, on the piston rod 76 of the FIGURE 2 mechanism, or any other suitable control mechanism may be provided. An intermediate follower 188 is pivoted at 190 on a suitable support 192 and has an upper surface 194 struck on an arc about the upper pivot 196 of the push rod 168 so that in all positions of the follower 170 the tappet clearance will be constant. I have shown several positions of the push rod in broken lines. The intermediate follower carries a roller 198 which bears against the camshaft 172. By this mechanism, the timing of the valve 162 both as to opening and closing will be constant, but depending upon the position of the follower 170 as determined by the rack position 186, the lift will be varied.

In FIGURE 14 I have shown a valve lift diagram for the FIGURE 13 mechanism. In FIGURE 14, the line of port control for the exhaust ports 156 is indicated at m. The lift for the valve 162, such as in FIGURE 13, at no load is indicated at n so that the total lift is quite large and the point of closing is approximately 300 degrees, with the time of opening being approximately 120 degrees, which may be the point at which the piston uncovers the exhaust ports 156 during the expansion stroke. Thus, a large amount of the air will be rejected through the valve 162 and a small amount will be entrapped. When a heavy load is applied but the supercharger has not come up to speed, the lift of the valve is reduced to the amount indicated at o and less air will be rejected through the valves 162 providing a larger entrapped volume. Thereafter, as the supercharger comes up in speed, the lift will increase up to the line p which may be the full load position. In a two cycle engine, this may be carried out in the arrangement shown in FIGURE 3 as well as in uniflow scavenged two cycle engines and opposed piston engines. Additionally, it may be carried out in a four cycle engine by providing a special rejection valve other than the exhaust valve. For example, see my prior Patent No. 2,817,322, issued December 24, 1957.

The use, operation and function of my invention are as follows:

I provide a method of operating a gas fueled, spark fired, turbocharged engine and an engine structure whereby when a rapid load change is applied to the engine, the engine will not stop or quit. This firing failure in previous supercharged gas engines has been caused by the exhaust driven supercharger lagging behind the actual load demand. The fuel supplied equals the load demand but the air supplied is substantially less. Accordingly, the engine is flooded and the rich mixture in the cylinder will not fire.

With my engine at full load, I entrap substantially less than the full volume engine capacity of the cylinders. At no load, the volume entrapped may be even smaller. In any event, as soon as a rapid load change is applied, for example, a rapid load increase, the valve actuation is immediately changed so that the volume entrapped is substantially increased and it may be increased to the full cylinder capacity. The weight of air entrapped, when mixed with the fuel corresponding to the heavy load, will provide an air-fuel ratio mixture that will ignite. Thereafter, as the supercharger comes up in speed, the pressure of the inlet air increases, and the valve actuating mechanism varies the operation of the valve or valves so that the weight of air in the cylinder will remain approximately constant. In the example given, either the time of closing or the lift of the valve is varied so that the weight entrapped remains constant as the volume is changed.

I have stressed variable valve timing to maintain the approximately constant air-fuel ratio at the various loads, but it should be understood that the valve timing may be constant and the supercharger may be matched to the engine so that the quantity of air supplied by the supercharger is automatically matched or proportioned to the load demands so that the mixture will remain approximately constant without throttling the inlet air at the lighter loads.

I have also given examples of the invention where the supercharger supplies air at a pressure that falls at a faster rate than the load so that the volume entrapped must be increased as load decreases. Additionally, the exhaust valve may be controlled so that as soon as load is applied and the engine is accelerating, the exhaust valve is opened earlier so that the energy in the cylinder is tapped to help the supercharger. When the supercharger comes up in speed, the exhaust valve opening may be retarded to provide a full expansion stroke. The invention may be applied to either two or four cycle engines and the appended claims should be interpreted accordingly.

It would also be apparent that the control mechanism does not have to be tied to the pressure of the air from the supercharger. For example, the feed-back of the valve actuation to decrease the volume entrapped as the supercharger comes up in speed may be tied to any factor that indicates the supercharger speed. I have given the pressure of the air in the inlet manifold because this pressure will directly vary with the speed, but at the same time some sort of a tachometer could be tied to the shaft of the supercharger indicating speed directly instead of the air connection 146 to actuate the valve 122. Various other examples could be given but the invention should include any device that is tied to a factor indicating supercharger speed to cause the valve or valves to be actuated to reduce the volume entrapped as the supercharger comes up in speed.

I might also add that instead of having the valve actuation tied to a factor indicating the supercharger speed, it might be tied to an automatic timing device so that as soon as the valve timing came to the position b in FIGURE 4, for example, it would automatically be timed to move to the position c over a predetermined period.

But I prefer that the mechanism be tied to the supercharger speed or a factor thereof.

Whereas I have shown and described a preferred form and shown several modifications of my invention and suggested several others, it will be understood that numerous additional modifications, substitutions, alterations and changes can be made without departing from the invention's fundamental theme. I, therefore, wish that the invention be unrestricted except as by the appended claims.

I claim:

1. An internal combustion engine having a cylinder and piston, an exhaust driven supercharger, and a valve mechanism for entrapping air in the cylinder for compression and combustion: a method of operating such an engine over a selected load range to compensate for supercharger lag during rapid load changes, including the steps of closing the valve mechanism at the highest load in the range to entrap substantially less air than the full cylinder capacity, operating the valve mechanism at each of the loads within the range to entrap a volume of air at each load related to the load on the engine, varying the operation of the valve mechanism, in response to a rapid load change to a particular load, from its normal operation at the particular load, to compensate for the supercharger lag to entrap a substantially different volume of air from that normally entrapped for the particular load, and bringing the operation of the valve mechanism back to normal for the particular load as the speed of the supercharger changes to the speed corresponding to the particular load.

2. The method of claim 1 further characterized by and including the step of cooling the charging air from the supercharger before it is admitted to the cylinder.

3. The method of claim 1 further characterized in that operating the valve mechanism includes timing the closing of the valve mechanism, and varying the operation of the valve mechanism includes changing the time of closing the valve mechanism.

4. The method of claim 1 further characterized in that the engine is a spark-fired gas-fueled engine, and including the step of varying the time of closing of the valve mechanism, in response to a rapid load increase, to rapidly increase the volume and weight of air entrapped, and thereafter changing the time of closing of the valve mechanism to reduce the volume of air entrapped as the supercharger speed and air pressure increase, while maintaining the weight of air entrapped approximately constant as the supercharger comes up to speed.

5. The method of claim 1 in which the engine is a spark-fired gas engine, and further including the step of varying the time of closing of the valve mechanism in response to a rapid load increase to a particular load to entrap a larger volume of air than that normally associated with the particular load, and thereafter changing the time of closing of the valve mechanism to reduce the volume entrapped in relation to the increased speed of the supercharger such that the weight of air entrapped will not decrease.

6. The method of claim 1 in which the valve mechanism is operated so that air is rejected from the cylinder during the compression stroke of the piston, and wherein the step of varying the lift of the valve mechanism is included in the steps of both varying the operation of the valve mechanism and also in bringing the operation of the valve mechanism back to normal.

7. A method of operating a spark-fired gas engine with an exhaust driven supercharger including the steps of entrapping a volume of air in the cylinder at the light loads that is substantially less than the full cylinder capacity, increasing the volume of air entrapped, in response to a rapid load increase, to an amount that is at least materially closer to the full cylinder capacity to maintain a mixture in the cylinder with an approximately constant air-fuel ratio, and thereafter reducing the volume of air entrapped as the supercharging pressure increases due to increasing supercharger speed to maintain an approximately constant air-fuel ratio mixture entrapped in the cylinder.

8. A method of operating a gas fueled, spark-fired, internal combustion engine, having an exhaust driven supercharger, to overcome supercharger lag and thereby to prevent the engine from missing and stopping when a heavy load is rapidly supplied, including the steps of entrapping a volume of air in the cylinder, in response to a rapid load increase, that approximates the full cylinder capacity, and decreasing the volume entrapped as the exhaust driven supercharger comes up to the speed corresponding to the applied load, and, at the same time, balancing the particular volume entrapped, as it decreases, against the pressure of the air being supplied by the supercharger, as it increases due to increasing supercharger speed, to maintain an approximately constant air-fuel ratio mixture in the cylinder during the transient load period.

9. An internal combustion engine having a cylinder and piston, an exhaust driven supercharger, and a valve mechanism for entrapping air in the cylinder for compression and combustion and for exhausting products of combustion to the supercharger: a method of operating combustion to the supercharger: a method of operating such an engine over a selected load range to compensate for supercharger lag during rapid load changes, including the steps of operating the valve mechanism at the higher loads in the range to entrap substantially less air than the full cylinder capacity and, at the same time, to provide approximately the maximum effective expansion of the products of combustion in the cylinder, operating the valve mechanism at each of the loads within the range to entrap a volume of air at each load related to the particular load on the engine, varying the operation of the valve mechanism, in response to a rapid load change to a particular load, from its normal operation at the particular load to compensate for the supercharger lag to entrap a substantially different volume of air from that normally entrapped for the particular load and, at the same time, to reduce the effective expansion stroke of the piston by exhausting the products of combustion to the supercharger early in the piston's expansion stroke to supply additional energy to the supercharger, and bringing the operation of the valve mechanism back to normal for the particular load as the speed of the supercharger changes to the speed corresponding to the particular load.

10. A method of operating a spark-fired, gas-fueled engine having an exhaust-driven supercharger, including the steps of entrapping a volume of air in the cylinder at the lighter loads that is substantially less than the full cylinder capacity, increasing the volume of air entrapped in response to a rapid load increase to an amount at least materially closer to the full cylinder capacity to maintain a mixture in the cylinder with an approximately constant air-fuel ratio and, at the same time, exhausting the products of combustion from the cylinder early during the expansion stroke to provide additional energy for the supercharger, and thereafter reducing the volume of air entrapped, as the supercharger comes up to speed, to maintain the approximately constant air-fuel ratio of the mixture entrapped in the cylinder and, at the same time, delaying the time of exhausting the products of combustion from the cylinder to increase the effective expansion stroke.

11. The method of claim 10 further characterized in that the engine is a four-cycle engine, and variable quantities of air are entrapped in the cylinder by varying the timing of the inlet valve, and the time of exhausting the products of combustion is varied by varying the time of opening of the exhaust valve during the expansion stroke of the piston.

12. The method of claim 11 further characterized by and including the step of reducing the valve overlap in response to a rapid load increase by simultaneously delaying the time of opening of the inlet valve and advancing the time of closing of the exhaust valve, and thereafter, as the supercharger comes up to speed, increasing the valve overlap by simultaneously advancing the time of opening of the inlet valve and delaying the time of closing of the exhaust valve.

13. A method of operating an engine with an exhaust driven supercharger, including the steps of entrapping a volume in the cylinder at light loads that is substantially less than the full volumetric capacity of the cylinder, increasing the volume entrapped, in response to a rapid load increase, to an amount that is at least materially closer to the full cylinder capacity, and thereafter reducing the volume entrapped as the supercharging pressure increases due to increased supercharger speed.

14. In an internal combustion engine having an exhaust driven supercharger and a gaseous fuel supply with a spark ignition device and at least one valve for each cylinder, the improvement including engine load responsive means actuating the valves to increase the volume of air entrapped in the cylinders in response to rapid load increase and entrapping a volume of air in the cylinders during full load that is appreciably less than their full capacity, and second means modifying said load responsive means to reduce the entrapped volume as the supercharger speed increases to maintain a constant air-fuel ratio.

15. In an internal combustion engine having an exhaust driven supercharger and a gaseous fuel supply with a spark ignition device and at least one valve for each cylinder, the improvement including engine load responsive means actuating the valves to increase the volume of air entrapped in the cylinders in response to rapid load increase and entrapping a volume of air in the cylinders during full load that is appreciably less than their full capacity, and second means responsive to the supercharge speed and modifying said load responsive means to reduce the entrapped volume to maintain a constant air-fuel ratio.

16. An internal combustion engine having an exhaust driven supercharger, engine load responsive means entrapping a volume in the cylinder during low load that is substantially less than the full volumetric capacity of the cylinder and increasing the volume entrapped in response to rapid load increase to an amount that is materially closer to the full cylinder capacity, and means responsive to supercharger outlet pressure reducing the volume entrapped with increasing supercharger pressure due to increasing supercharger speed.

17. The structure of claim 14 further characterized in that said last mentioned means is responsive to supercharger speed.

18. The structure of claim 15 wherein said last mentioned means includes mechanism for varying the time of closing of the valves.

19. The structure of claim 15 wherein said last mentioned means includes mechanism for varying the lift of the valves.

20. The structure of claim 15 in which the engine is a four stroke cycle engine and the valves include an inlet valve for each cylinder.

21. The structure of claim 15 further characterized by and including an intercooler for withdrawing at least a part of the heat of compression from the air between the supercharger and the cylinders.

22. The structure of claim 15 wherein the engine is a loop scavenged two cycle engine with inlet and exhaust ports in the cylinder wall, the valves including a rejection valve constructed to reject variable quantities of air from the cylinder, depending upon the load, that would otherwise be entrapped.

References Cited in the file of this patent

UNITED STATES PATENTS

| | | |
|---|---|---|
| 2,097,883 | Johansson | Nov. 2, 1937 |
| 2,292,233 | Lysholm | Aug. 4, 1942 |
| 2,401,188 | Prince | May 28, 1946 |
| 2,670,595 | Miller | Mar. 2, 1954 |